United States Patent
Chen et al.

(10) Patent No.: US 12,434,127 B2
(45) Date of Patent: Oct. 7, 2025

(54) CONVERTIBLE CASTER BOARD

(71) Applicant: Razor USA LLC, Cerritos, CA (US)

(72) Inventors: Robert Chen, Cerritos, CA (US); Ian Desberg, Cerritos, CA (US); Kyle McDonald, Cerritos, CA (US); Jerry Tao, Cerritos, CA (US)

(73) Assignee: Razor USA LLC, Cerritos, CA (US)

( * ) Notice: Subject to any disclaimer, the term of this patent is extended or adjusted under 35 U.S.C. 154(b) by 0 days.

(21) Appl. No.: 17/488,042

(22) Filed: Sep. 28, 2021

(65) Prior Publication Data
US 2022/0096913 A1    Mar. 31, 2022

Related U.S. Application Data

(60) Provisional application No. 63/141,873, filed on Jan. 26, 2021.

(30) Foreign Application Priority Data

Sep. 29, 2020    (CN) .......................... 202022178427.4

(51) Int. Cl.
*A63C 17/00*    (2006.01)
*A63C 17/01*    (2006.01)

(52) U.S. Cl.
CPC ........ *A63C 17/0033* (2013.01); *A63C 17/012* (2013.01); *A63C 2203/40* (2013.01)

(58) Field of Classification Search
CPC .............. A63C 17/0033; A63C 17/012; A63C 2203/40; A63C 17/016; A63C 2203/06;
(Continued)

(56) References Cited

U.S. PATENT DOCUMENTS

| | | |
|---|---|---|
| 2,051,762 A | 8/1936 | Vincent |
| 3,288,251 A | 11/1966 | Paul |

(Continued)

FOREIGN PATENT DOCUMENTS

| | | |
|---|---|---|
| AU | 2007214338 | 3/2007 |
| CA | 2596570 | 10/2007 |

(Continued)

OTHER PUBLICATIONS

CN-207667107-U English Translation (Year: 2018).*

(Continued)

*Primary Examiner* — James A Shriver, II
*Assistant Examiner* — Michael T. Walsh
(74) *Attorney, Agent, or Firm* — Knobbe, Martens, Olson & Bear, LLP

(57) ABSTRACT

A caster board can include a front platform section connected by a torsion bar or other neck portion to a rear platform section. The caster board can be convertible between a first configuration in which the caster board has three wheels, and a second configuration in which the caster board has two wheels. In the first configuration, the rear platform section can be supported by two wheels laterally offset from a longitudinal axis of the caster board. In the second configuration, the rear platform section can be supported by one wheel aligned with a longitudinal axis of the caster board. The rear platform section can include at least three mounting locations configured to have caster assemblies installed therein.

20 Claims, 12 Drawing Sheets

(58) Field of Classification Search
CPC ... A63C 17/06; A63C 17/068; A63C 17/0073; A63C 17/013; A63C 17/062; A63C 17/014; A63C 17/067; A63C 17/065; B60B 33/0071; B60B 33/0076
See application file for complete search history.

(56) References Cited

U.S. PATENT DOCUMENTS

| | | | |
|---|---|---|---|
| 3,399,904 A | 9/1968 | Schinke | |
| 3,399,906 A | 9/1968 | Portnoff | |
| 3,771,811 A | 11/1973 | Bueno | |
| 3,982,766 A | 9/1976 | Budge | |
| D243,206 S | 1/1977 | Sherwood | |
| 4,037,852 A | 7/1977 | Bayer et al. | |
| D246,065 S | 10/1977 | Saul | |
| 4,060,253 A | 11/1977 | Oldendorf | |
| 4,076,265 A | 2/1978 | Eash, II | |
| 4,076,267 A | 2/1978 | Lipscomb | |
| 4,082,306 A * | 4/1978 | Sheldon | A63C 17/01 D21/765 |
| 4,092,033 A | 5/1978 | Swain | |
| 4,093,252 A | 6/1978 | Rue | |
| D250,492 S | 12/1978 | Kish | |
| 4,140,326 A | 2/1979 | Huber | |
| 4,245,848 A | 1/1981 | Dudouyt | |
| 4,295,656 A | 10/1981 | Moore | |
| 4,359,231 A | 11/1982 | Mulcahy | |
| 4,411,442 A | 10/1983 | Rills | |
| 4,451,055 A | 5/1984 | Lee | |
| 4,902,256 A | 2/1990 | Berglund | |
| 4,915,403 A | 4/1990 | Wild | |
| 4,921,513 A | 5/1990 | Parten | |
| 4,930,794 A | 6/1990 | Chan | |
| 4,930,924 A | 6/1990 | Hunt | |
| 4,955,626 A | 9/1990 | Smith | |
| 5,029,702 A | 7/1991 | Tong | |
| 5,067,058 A | 11/1991 | Standley | |
| 5,098,087 A | 3/1992 | Matile | |
| 5,160,155 A | 11/1992 | Barachet | |
| 5,221,111 A | 6/1993 | Younger | |
| 5,267,743 A | 12/1993 | Smisek | |
| D345,406 S | 3/1994 | Shankland | |
| D346,418 S | 4/1994 | Fischbach | |
| 5,330,026 A | 7/1994 | Hsu et al. | |
| 5,347,681 A | 9/1994 | Wattron et al. | |
| 5,419,570 A | 5/1995 | Bollotte | |
| 5,458,351 A | 10/1995 | Yu | |
| 5,460,558 A | 10/1995 | Woodstock | |
| 5,492,345 A | 2/1996 | Kruczek | |
| 5,505,474 A | 4/1996 | Yeh | |
| 5,529,523 A | 6/1996 | Wilhelmi | |
| 5,540,455 A | 7/1996 | Chambers | |
| 5,549,331 A | 8/1996 | Yun | |
| 5,566,956 A | 10/1996 | Wang | |
| 5,601,299 A | 2/1997 | Yun | |
| 5,622,759 A | 4/1997 | Fuster | |
| 5,707,068 A | 1/1998 | Bradfield | |
| 5,766,051 A | 6/1998 | Messer | |
| 5,826,895 A | 10/1998 | Bradfield | |
| 5,853,182 A | 12/1998 | Finkle | |
| 5,855,385 A | 1/1999 | Hambsch | |
| 5,884,983 A | 3/1999 | Wu | |
| 5,893,425 A | 4/1999 | Finkle | |
| D410,515 S | 6/1999 | Alexander | |
| 5,910,035 A | 6/1999 | Rebotier et al. | |
| D413,954 S | 9/1999 | Gerlach | |
| 5,947,495 A | 9/1999 | Null et al. | |
| 5,984,328 A | 11/1999 | Tipton | |
| D422,661 S | 4/2000 | Edwards et al. | |
| D422,662 S | 4/2000 | Edwards et al. | |
| 6,050,357 A | 4/2000 | Staelin | |
| 6,056,302 A | 5/2000 | Smith | |
| 6,059,303 A | 5/2000 | Bradfield | |
| 6,102,415 A | 8/2000 | Stewardson | |
| 6,106,347 A | 8/2000 | Harness | |
| 6,193,249 B1 | 2/2001 | Buscaglia | |
| 6,206,389 B1 | 3/2001 | Yagi | |
| 6,254,113 B1 | 7/2001 | Dornan | |
| 6,293,565 B1 | 9/2001 | Bouchard et al. | |
| 6,315,304 B1 | 11/2001 | Kirkland et al. | |
| 6,328,328 B1 | 12/2001 | Finiel | |
| 6,338,494 B1 | 1/2002 | Killian | |
| D455,186 S | 4/2002 | Koester | |
| D456,047 S | 4/2002 | Mandic | |
| 6,398,237 B1 | 6/2002 | Attey | |
| 6,419,248 B1 | 7/2002 | Kay | |
| 6,419,249 B1 | 7/2002 | Chen | |
| 6,428,022 B1 | 8/2002 | Namiki | |
| 6,440,526 B1 | 8/2002 | Gamble et al. | |
| 6,481,724 B1 | 11/2002 | Whipp | |
| 6,485,044 B1 | 11/2002 | Blake | |
| 6,494,467 B1 | 12/2002 | Menges | |
| 6,502,850 B1 | 1/2003 | Schaller et al. | |
| 6,572,130 B2 | 6/2003 | Greene et al. | |
| 6,669,215 B2 | 12/2003 | Laporte | |
| 6,698,776 B2 | 3/2004 | Todd | |
| 6,808,196 B2 | 10/2004 | Des Ouches | |
| 6,863,292 B1 | 3/2005 | Paasch et al. | |
| D503,763 S | 4/2005 | Morgan | |
| D506,427 S | 6/2005 | Weber | |
| 6,910,698 B2 | 6/2005 | Turner et al. | |
| D510,046 S | 9/2005 | Li | |
| 6,976,687 B2 | 12/2005 | Beleki, Jr. | |
| 6,979,006 B2 | 12/2005 | Pierron | |
| 7,044,486 B2 | 5/2006 | Wright | |
| 7,053,289 B2 | 5/2006 | Iwai et al. | |
| 7,070,193 B2 | 7/2006 | Yamaguchi | |
| 7,083,178 B2 | 8/2006 | Potter | |
| 7,093,842 B2 | 8/2006 | Potter | |
| 7,182,360 B2 | 2/2007 | Paasch et al. | |
| 7,195,259 B2 * | 3/2007 | Gang | A63C 17/014 280/87.041 |
| 7,198,280 B2 | 4/2007 | Hara | |
| 7,213,823 B1 | 5/2007 | Vujtech | |
| 7,252,625 B1 | 8/2007 | Perka | |
| D552,201 S | 10/2007 | Kwak | |
| D556,283 S | 11/2007 | Hamborg et al. | |
| 7,316,597 B2 | 1/2008 | Skedeleski | |
| D561,289 S | 2/2008 | Stanisewski | |
| 7,325,819 B2 | 2/2008 | Kwak | |
| D564,613 S | 3/2008 | Hamborg | |
| 7,338,056 B2 | 3/2008 | Chen et al. | |
| 7,367,572 B2 * | 5/2008 | Jiang | A63C 17/12 280/87.041 |
| D572,332 S | 7/2008 | Sramek et al. | |
| D577,789 S | 9/2008 | Mazur | |
| 7,441,787 B1 | 10/2008 | Jordan | |
| 7,600,768 B2 * | 10/2009 | Chen | A63C 17/016 280/87.05 |
| D607,521 S | 1/2010 | Chables et al. | |
| D607,524 S | 1/2010 | Marciano | |
| D608,851 S | 1/2010 | Hillman | |
| D614,714 S | 4/2010 | Walworth | |
| 7,766,351 B2 | 8/2010 | Chen et al. | |
| 7,775,534 B2 * | 8/2010 | Chen | A63C 17/016 280/87.01 |
| D623,701 S | 9/2010 | Dalgaard et al. | |
| D623,702 S | 9/2010 | Dalgaard et al. | |
| 7,867,050 B2 | 1/2011 | Crispin | |
| 7,891,680 B2 | 2/2011 | Chen et al. | |
| D638,494 S | 5/2011 | Scolari et al. | |
| 8,047,556 B2 | 11/2011 | Jang et al. | |
| 8,061,725 B1 | 11/2011 | Hawkins | |
| 8,118,319 B2 | 2/2012 | Hsieh | |
| D655,772 S | 3/2012 | Bin | |
| 8,157,274 B2 | 4/2012 | Chen | |
| D667,382 S | 9/2012 | Cosentino | |
| D673,233 S | 12/2012 | Baggett | |
| 8,360,475 B2 | 1/2013 | Cristiano | |
| 8,408,565 B2 | 4/2013 | An | |
| 8,414,000 B2 * | 4/2013 | Chen | A63C 17/016 280/87.021 |
| 8,469,376 B2 | 6/2013 | Kristiansen | |
| D692,079 S | 10/2013 | Mackay | |

(56) References Cited

U.S. PATENT DOCUMENTS

| | | |
|---|---|---|
| D692,080 S | 10/2013 | Hamborg et al. |
| 8,632,084 B2 | 1/2014 | Lovley, II et al. |
| D698,881 S | 2/2014 | Hamborg |
| D699,803 S | 2/2014 | Yamabe |
| D705,372 S | 5/2014 | Harris |
| 8,720,916 B2 | 5/2014 | Bermal |
| 8,857,831 B1 | 10/2014 | Rotondo |
| 8,864,152 B1 | 10/2014 | Danze |
| 8,915,506 B2 | 12/2014 | Piaceski et al. |
| 8,936,263 B2 | 1/2015 | Rawlins |
| D724,166 S | 3/2015 | Hamborg et al. |
| D728,048 S | 4/2015 | Stover |
| 9,010,778 B1 | 4/2015 | Burns |
| D739,906 S | 9/2015 | Chen |
| D743,381 S | 11/2015 | Pi et al. |
| 9,186,570 B1 | 11/2015 | Wells |
| 9,302,173 B2 | 4/2016 | DiCarlo |
| 9,393,481 B2 | 7/2016 | Fournier |
| D770,585 S | 11/2016 | Desberg |
| 9,492,731 B2 | 11/2016 | Marusiak et al. |
| D785,115 S | 4/2017 | Ying |
| D789,366 S | 6/2017 | Jentz et al. |
| D790,015 S | 6/2017 | Tan |
| 9,682,309 B2 | 6/2017 | Huang |
| D792,931 S | 7/2017 | Desberg |
| D799,450 S | 10/2017 | Lee et al. |
| 9,795,864 B1 | 10/2017 | Bao |
| 9,975,035 B1 | 5/2018 | Wang |
| 10,022,615 B2 | 7/2018 | Huang |
| 10,022,616 B1 | 7/2018 | Consol |
| D827,748 S | 9/2018 | Desberg |
| D829,838 S | 10/2018 | Huang |
| D865,096 S | 10/2019 | Desberg |
| 10,486,052 B2 | 11/2019 | Choi |
| D871,532 S | 12/2019 | Huang |
| 10,625,830 B2 | 4/2020 | Lenchner et al. |
| 10,709,960 B2 | 7/2020 | Huang |
| 10,787,218 B2 | 9/2020 | Wen |
| D899,543 S | 10/2020 | Desberg |
| D911,476 S | 2/2021 | Huang |
| D920,197 S | 5/2021 | Wan |
| D940,805 S | 1/2022 | Desberg |
| D942,572 S | 2/2022 | Huang |
| 11,273,363 B1* | 3/2022 | DeGraff ............... A43B 5/16 |
| 11,446,562 B2 | 9/2022 | Desberg |
| 11,478,693 B2 | 10/2022 | Huang |
| 11,844,998 B2 | 12/2023 | Desberg |
| D1,012,217 S | 1/2024 | Huang |
| 11,951,382 B2 | 4/2024 | Chen et al. |
| 2002/0043774 A1 | 4/2002 | Chou |
| 2002/0067015 A1 | 6/2002 | Tierney et al. |
| 2002/0149166 A1 | 10/2002 | Potter |
| 2002/0195788 A1 | 12/2002 | Tierney et al. |
| 2003/0124923 A1 | 7/2003 | Mercer |
| 2003/0141688 A1 | 7/2003 | Lynn |
| 2003/0155725 A1 | 8/2003 | Roderick |
| 2003/0155733 A1 | 8/2003 | Tan et al. |
| 2004/0021281 A1 | 2/2004 | Stephens |
| 2004/0144582 A1 | 7/2004 | Baker et al. |
| 2004/0163867 A1 | 8/2004 | Hillman |
| 2004/0212160 A1 | 10/2004 | Roderick |
| 2004/0262872 A1 | 12/2004 | Kang |
| 2005/0160902 A1 | 7/2005 | Iwai et al. |
| 2006/0032682 A1 | 2/2006 | Hillman |
| 2006/0032685 A1 | 2/2006 | Koide |
| 2006/0038361 A1 | 2/2006 | Sano |
| 2006/0049595 A1 | 3/2006 | Crigler |
| 2006/0055135 A1 | 3/2006 | Tracewell et al. |
| 2006/0055137 A1 | 3/2006 | Jiang |
| 2006/0163830 A1* | 7/2006 | Kwak ............... A63C 17/0033 280/87.042 |
| 2007/0001414 A1 | 1/2007 | Kang |
| 2007/0035102 A1 | 2/2007 | McClain |
| 2007/0132199 A1 | 6/2007 | Smith |
| 2007/0252355 A1 | 11/2007 | Chen et al. |
| 2007/0257459 A1 | 11/2007 | Gang |
| 2007/0272465 A1 | 11/2007 | Su |
| 2007/0273118 A1* | 11/2007 | Conrad ............... A63C 17/016 280/87.042 |
| 2007/0296164 A1 | 12/2007 | Roderick |
| 2009/0045598 A1 | 2/2009 | Lee |
| 2009/0058028 A1 | 3/2009 | Chen |
| 2009/0134591 A1 | 5/2009 | Chen et al. |
| 2009/0206571 A1 | 8/2009 | Francom et al. |
| 2009/0270002 A1 | 10/2009 | Crispin |
| 2009/0295111 A1 | 12/2009 | O'Rourke |
| 2010/0222941 A1 | 9/2010 | Chang |
| 2010/0225080 A1 | 9/2010 | Smith |
| 2010/0253027 A1 | 10/2010 | Chen et al. |
| 2011/0006497 A1 | 1/2011 | Chen et al. |
| 2011/0037238 A1 | 2/2011 | Devine |
| 2011/0127740 A1 | 6/2011 | Yamabe |
| 2011/0133420 A1 | 6/2011 | Smith |
| 2011/0187069 A1 | 8/2011 | Marcel |
| 2012/0091677 A1 | 4/2012 | Wu |
| 2012/0125807 A1 | 5/2012 | Jones et al. |
| 2012/0187648 A1 | 7/2012 | Chen |
| 2013/0001910 A1 | 1/2013 | Hsu |
| 2013/0168936 A1* | 7/2013 | Morita ............... A63C 17/012 280/87.042 |
| 2013/0277939 A1 | 10/2013 | Yamabe |
| 2014/0210175 A1 | 7/2014 | Hsu |
| 2014/0262574 A1 | 9/2014 | Rodgers et al. |
| 2015/0160902 A1 | 6/2015 | Tsujita |
| 2015/0202526 A1 | 7/2015 | Rawlins |
| 2016/0332062 A1 | 11/2016 | Wu et al. |
| 2017/0056756 A1 | 3/2017 | Pikulski |
| 2017/0151489 A1 | 6/2017 | Kim |
| 2018/0273129 A1 | 9/2018 | Baron |
| 2018/0296907 A1 | 10/2018 | Huang |
| 2018/0318698 A1 | 11/2018 | Ji |
| 2018/0361226 A1 | 12/2018 | Cho |
| 2019/0070486 A1 | 3/2019 | Shi |
| 2020/0282296 A1 | 9/2020 | Chen et al. |
| 2020/0346099 A1 | 11/2020 | Li |
| 2022/0096913 A1 | 3/2022 | Chen et al. |
| 2023/0102779 A1 | 3/2023 | Kermani et al. |
| 2023/0130257 A1 | 4/2023 | Huang |
| 2023/0134906 A1 | 5/2023 | Desberg |

FOREIGN PATENT DOCUMENTS

| | | |
|---|---|---|
| CN | 101309730 | 11/2008 |
| CN | 201205442 | 3/2009 |
| CN | 201482126 L | 5/2010 |
| CN | 201505425 U | 6/2010 |
| CN | 202070117 U | 12/2011 |
| CN | 206183946 | 5/2017 |
| CN | 207157383 U | 3/2018 |
| CN | 304695609 S | 6/2018 |
| CN | 207667107 U * | 7/2018 |
| CN | 213347728 U | 6/2021 |
| CN | 214209406 U | 9/2021 |
| DE | 202008012754 | 1/2009 |
| DK | 176806 | 10/2009 |
| EP | 1511541 | 3/2005 |
| EP | 1679101 | 7/2006 |
| GB | 2318519 | 4/1998 |
| GB | 2464676 | 4/2010 |
| JP | HOI-117385 U | 8/1989 |
| JP | H10-211313 | 8/1998 |
| JP | 2000-500369 | 1/2000 |
| JP | 2001-029663 | 2/2001 |
| JP | 2005-537820 | 12/2005 |
| JP | 3124619 U | 8/2006 |
| JP | 2007-136034 | 6/2007 |
| JP | 3159374 U | 5/2010 |
| JP | A 2015-527908 | 9/2015 |
| KR | 200371541 Y1 * | 1/2005 |
| KR | 10 20050060368 | 6/2005 |
| KR | 200 400 315 Y1 | 11/2005 |
| KR | 200 410 530 Y1 | 3/2006 |
| KR | 10-2007-0047491 | 5/2007 |
| KR | 100727006 B1 * | 6/2007 |

(56) References Cited

FOREIGN PATENT DOCUMENTS

| | | | |
|---|---|---|---|
| KR | 10-2007-0098467 | | 10/2007 |
| KR | 20070097765 A | * | 10/2007 |
| KR | 20090003996 U | * | 4/2009 |
| KR | 10-0921839 | | 10/2009 |
| KR | 10-20010110239 | | 12/2011 |
| KR | 20120000804 U | * | 2/2012 |
| KR | 200462622 Y1 | | 9/2012 |
| KR | 200465548 Y1 | * | 2/2013 |
| KR | 101344625 B1 | * | 12/2013 |
| KR | 20160002496 A | | 1/2016 |
| SU | 1405865 | | 4/1986 |
| TW | 247446 | | 5/1995 |
| TW | 266104 | | 12/1995 |
| TW | M427179 U | | 4/2012 |
| TW | M481045 U | | 7/2014 |
| TW | M560326 U | | 5/2018 |
| WO | WO 1993/01870 | | 2/1993 |
| WO | WO 1997/018865 | | 5/1997 |
| WO | WO 1999/39787 | | 8/1999 |
| WO | WO 2002/040116 | | 5/2002 |
| WO | WO 2003/092831 | | 11/2003 |
| WO | WO-03092831 A1 * | 11/2003 | ......... A63C 17/0033 |
| WO | WO 2004/105901 | | 12/2004 |
| WO | WO 2006/022472 | | 3/2006 |
| WO | WO 2005/014128 | | 9/2006 |
| WO | WO 2007/102645 | | 9/2007 |
| WO | WO 2007/111466 | | 10/2007 |
| WO | WO 2007/117092 | | 10/2007 |
| WO | WO 2007/127554 | | 11/2007 |
| WO | WO 2007/139356 | | 12/2007 |
| WO | WO 2009/036074 | | 3/2009 |
| WO | WO 2009/100722 | | 8/2009 |
| WO | WO 2009/128586 | | 10/2009 |
| WO | WO 2010/019627 | | 2/2010 |
| WO | WO 2012/083950 | | 6/2012 |
| WO | WO 2013/012129 A1 | | 1/2013 |
| WO | WO 2014/009760 | | 1/2014 |
| WO | WO 2016/086066 A1 | | 6/2016 |
| WO | WO 2016/094806 A1 | | 6/2016 |
| WO | WO 2018/195103 | | 10/2018 |
| WO | WO 2020/181093 | | 9/2020 |
| WO | WO 2021/055852 | | 3/2021 |
| WO | WO 2022/072367 A1 | | 4/2022 |
| WO | WO 2023/056340 A1 | | 4/2023 |

OTHER PUBLICATIONS

KR-200465548-Y1 English Translation (Year: 2013).*
KR-20090003996-U English Translation (Year: 2009).*
KR-100727006-B1 English Translation (Year: 2007).*
KR-200371541-Y1 English Translation (Year: 2005).*
"About: Skateboarding; Other Boardsports", http://skateboard.about.com/cs/fringeboarding/gr/?once-true&; Mar. 2007, in 2 pages.
"About: Skateboarding; The Wave" http://skateboard.about.com/cs/fringeboarding/gr/XBoard.html; Jan. 2007, in 2 pages.
Micelle' Electric Wave Board [XinCheJian], URL—http://xinchejian.com/2011/05/07/miclles-electric-wave-board/; May 2011, in 6 pages.
The Wave, Streetsurfing, http://www.streetsurfing.com/wave/skating.html; Mar. 2007, in 2 pages.
International Search Report and Written Opinion in corresponding International Application No. PCT/US2021/052445, dated Dec. 16, 2021, in 9 pages.
International Preliminary Report on Patentability in corresponding International Application No. PCT/US2021/052445, dated Apr. 13, 2023, in 6 pages.

* cited by examiner

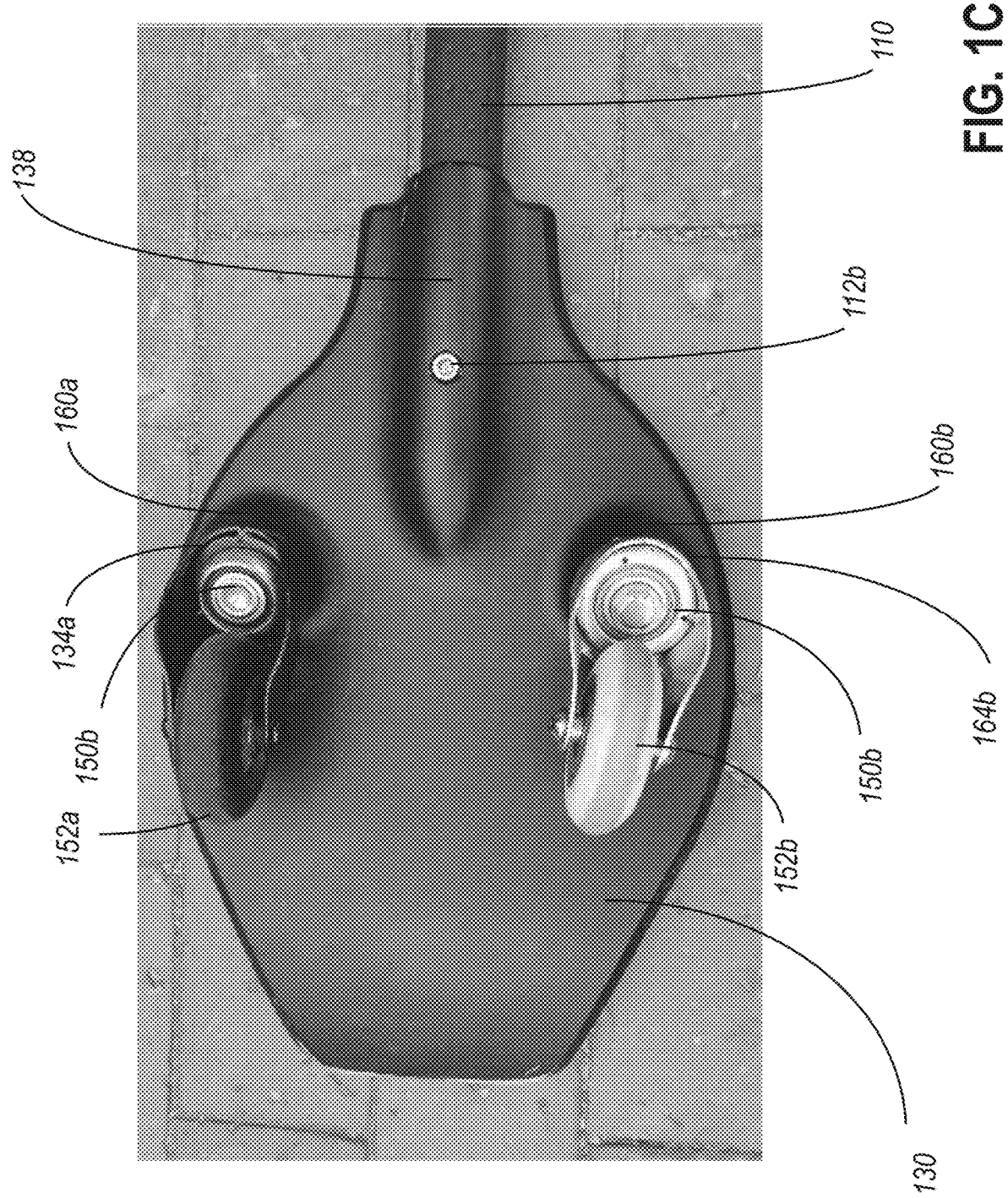

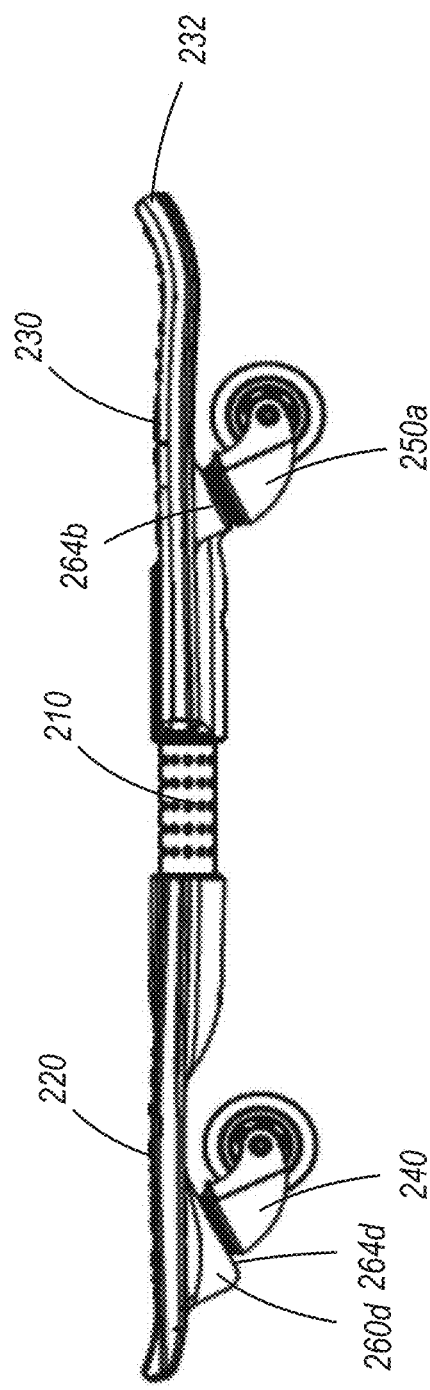
FIG. 4B
FIG. 4C
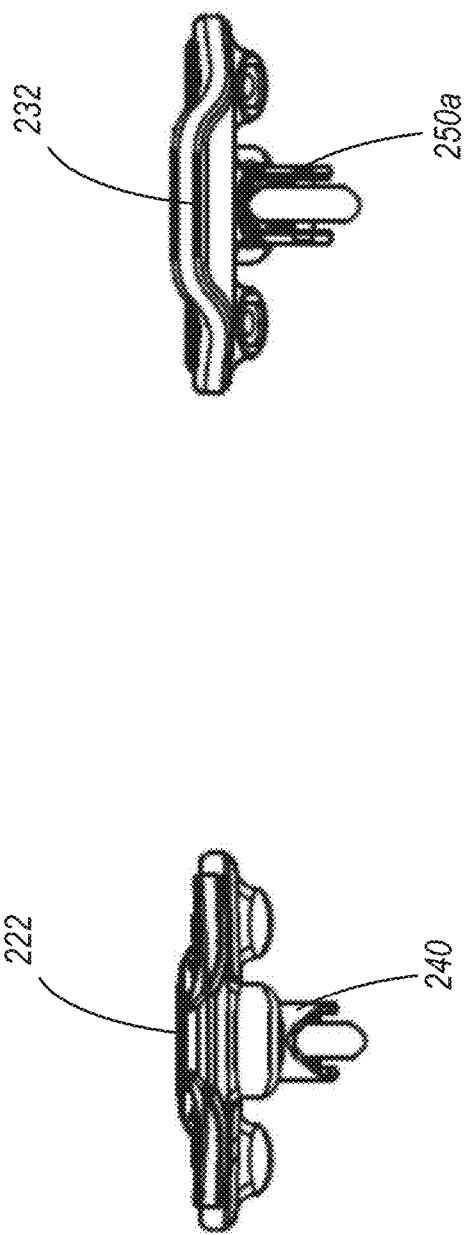
FIG. 4D

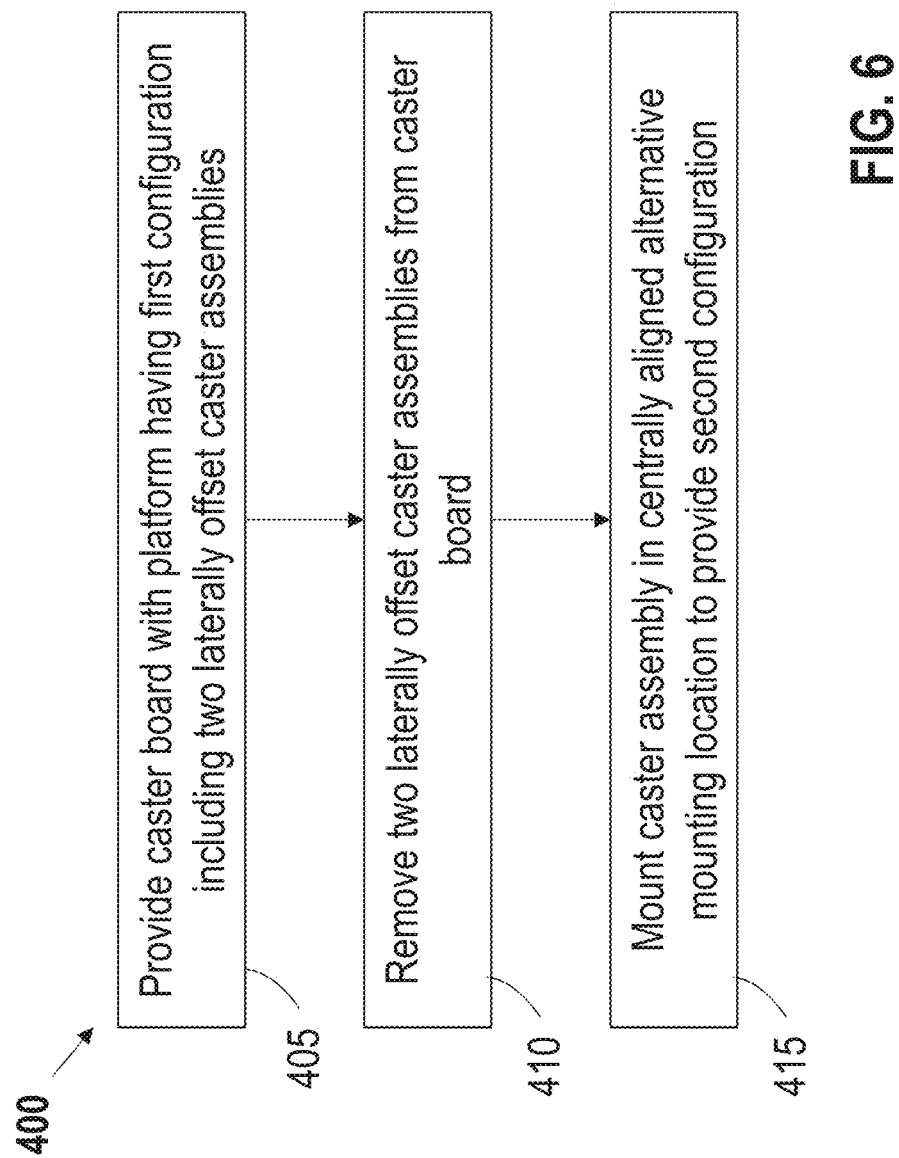

CONVERTIBLE CASTER BOARD

CROSS-REFERENCE

This application claims the priority benefit of U.S. Provisional Patent Application No. 63/141,873, filed Jan. 26, 2021, and claims priority to Chinese Utility Model Patent Application No. 2020221784274, filed Sep. 29, 2020, each of which are hereby incorporated by reference in their entirety. Additionally, all applications for which a foreign or domestic priority claim is identified in the Application Data Sheet as filed with the present application are hereby incorporated by reference under 37 CFR 1.57.

BACKGROUND

Field of the Disclosure

This disclosure relates generally to wheeled vehicles, such as caster boards that include platforms connected by a torsion bar or other structure which allows relative rotation of the platforms relative to one another.

Description of Certain Related Art

Some caster boards are two-wheeled vehicles that includes a deck with two platforms that are connected by torsion bar and/or a neck region of the platform. The neck region and/or torsion bar can function as a torsion element and may be configured to resiliently twist along a longitudinal axis of the vehicle. One or more wheels can be attached to each platform. The wheels can be caster wheels. A rider can stand on the deck and obtain locomotion by pivoting the front and rear platforms relative to each other with a twisting motion.

SUMMARY OF CERTAIN FEATURES

In one broad aspect, a convertible caster board assembly is provided, including a first platform section supported by a first caster assembly including a first wheel, a second platform section, the second platform section including a plurality of wheel mounting locations, a first wheel mounting location of the plurality of wheel mounting locations being aligned with a longitudinal axis of the caster board, and a second wheel mounting location of the plurality of wheel mounting locations being laterally offset from the longitudinal axis of the caster board, the second platform section supported by a second caster assembly including a second wheel, the second caster assembly installed at one of the plurality of wheel mounting locations, and a connecting structure extending between the first platform section and the second platform section.

A third wheel mounting location of the plurality of wheel mounting locations can be laterally offset from the longitudinal axis of the caster board on the opposite side of the longitudinal axis of the caster board as the second wheel mounting location. The second caster assembly can be installed at the first wheel mounting location, and where no caster assemblies are installed at the second and third wheel mounting locations. The convertible caster board assembly can additionally include a third caster assembly including a third wheel, where the second caster assembly is installed at the second wheel mounting location, and where the third caster assembly is installed at the third wheel mounting location.

The first wheel mounting location can include an aperture extending through an angled mounting surface extending at an oblique angle from a lower surface of the second platform section and facing away from the connecting structure. The second wheel mounting location can include an aperture extending through a second angled mounting surface extending at an oblique angle from a lower surface of the second platform section and facing away from the connecting structure. The second wheel mounting location can include a second aperture extending through the angled mounting surface.

The second wheel can be part of a caster assembly. The connecting structure can permit the first platform section to twist about the longitudinal axis of the caster board relative to the second platform section. The connecting structure can include a torsion bar.

In another broad aspect, a convertible caster board assembly is provided, including a front platform section supported by a first caster assembly, a rear platform section connected to the front platform section by a neck and supported by a second caster assembly, the rear platform section including a plurality of mounting locations, the plurality of mounting locations including a central mounting location, a first offset mounting location laterally offset from the central mounting location in a first lateral direction, and a second offset mounting location laterally offset from the central mounting location in a second lateral direction opposite the first lateral direction, the second caster assembly installed in one of the plurality of mounting locations.

Each of the plurality of mounting locations can be configured to have the second caster assembly installed therein. Each of the plurality of mounting locations can include an aperture extending through a mounting surface oriented at an oblique angle to a lower surface of the rear platform. Each of the plurality of mounting locations underlies a depression in an upper surface of the rear platform section. The neck can include a torsion bar.

In another broad aspect, a method of converting a caster board between a first configuration and a second configuration is provided, the caster board including a first platform section connected by a neck section to a second platform section, the method including removing a caster assembly installed at a first mounting location on the first platform section, and installing a caster assembly at a second mounting location on the first platform section, the first and second mounting locations laterally offset from a longitudinal axis of the caster board by different distances.

Installing a caster assembly at the second mounting location on the first platform section can include installing the caster assembly removed from the first mounting location on the first platform section. The method can additionally include installing a second caster assembly at a third mounting location on the first platform section, the third mounting location offset laterally offset from a longitudinal axis of the caster board by the same distance as the second mounting location. The second mounting location can be aligned with the longitudinal axis of the caster board. The first platform section can include a rear section of the caster board, and the second platform section can include a front section of the caster board.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise.

FIG. 1C depicts a bottom view of a rear deck of the caster board of FIG. 1A.

FIG. 4B is a left side view of the caster board configuration of FIG. 4A, the right side view being a mirror image thereof.

FIG. 4C is a front view of the caster board configuration of FIG. 4A.

FIG. 4D is a rear view of the caster board configuration of FIG. 4A.

FIG. 6 schematically depicts a process for modifying a configuration of a convertible caster board.

DETAILED DESCRIPTION OF CERTAIN EMBODIMENTS

Various embodiments of inventive caster boards are disclosed. In contrast to a traditional skateboard, which can include a single contiguous deck with a forward pair of wheels and a rearward pair of wheels mounted on the underside of the deck, a caster board can include multiple (e.g., a pair) of platform sections which are connected to one another in a manner which permits movement of the platforms with respect to one another. In particular, a caster board can allow a relative twisting, about a longitudinal axis of the board, of at least one of the platforms with respect to the other platform sections.

In some embodiments, the caster board may include a single contiguous platform with a narrower and/or more flexible neck portion which allows rotation between wider platform portions at the front and rear of the caster board. In other embodiments, a discrete rotationally biasing structure, such as a torsion bar, may be used to connect front and rear platforms. Such a torsion bar, or similar rotationally biasing structure, may allow the front platform to be twisted relative to the rear platform about a longitudinal axis of the caster board when a rider applies a twisting force to one or both of the platforms, and bias the platforms to return to a neutral state in which the platforms are substantially parallel to one another. Embodiments of caster boards including a torsion bar, also referred to as a twist-pipe, are described in U.S. Pat. No. 7,195,259, the disclosure of which is hereby incorporated by reference in its entirety.

In some embodiments, the caster board can have a single wheel on each of the front and rear platform sections, with the wheels longitudinally aligned with a central longitudinal axis of the caster board. Such an arrangement allows for a much greater range of motion of the platform surfaces relative to the ground than a conventional skateboard, as well as significant flexibility between the front and rear platform sections. This range of motion, and the twisting motion associated with operation of the caster board, can be difficult to adjust to for a rider who is new to skateboarding, or who is accustomed to the propulsion and control of a traditional skateboard. In some embodiments, an alternative wheel arrangement can be used to provide additional stability, while still allowing the unique operation and control of a caster board.

Figure 1A:
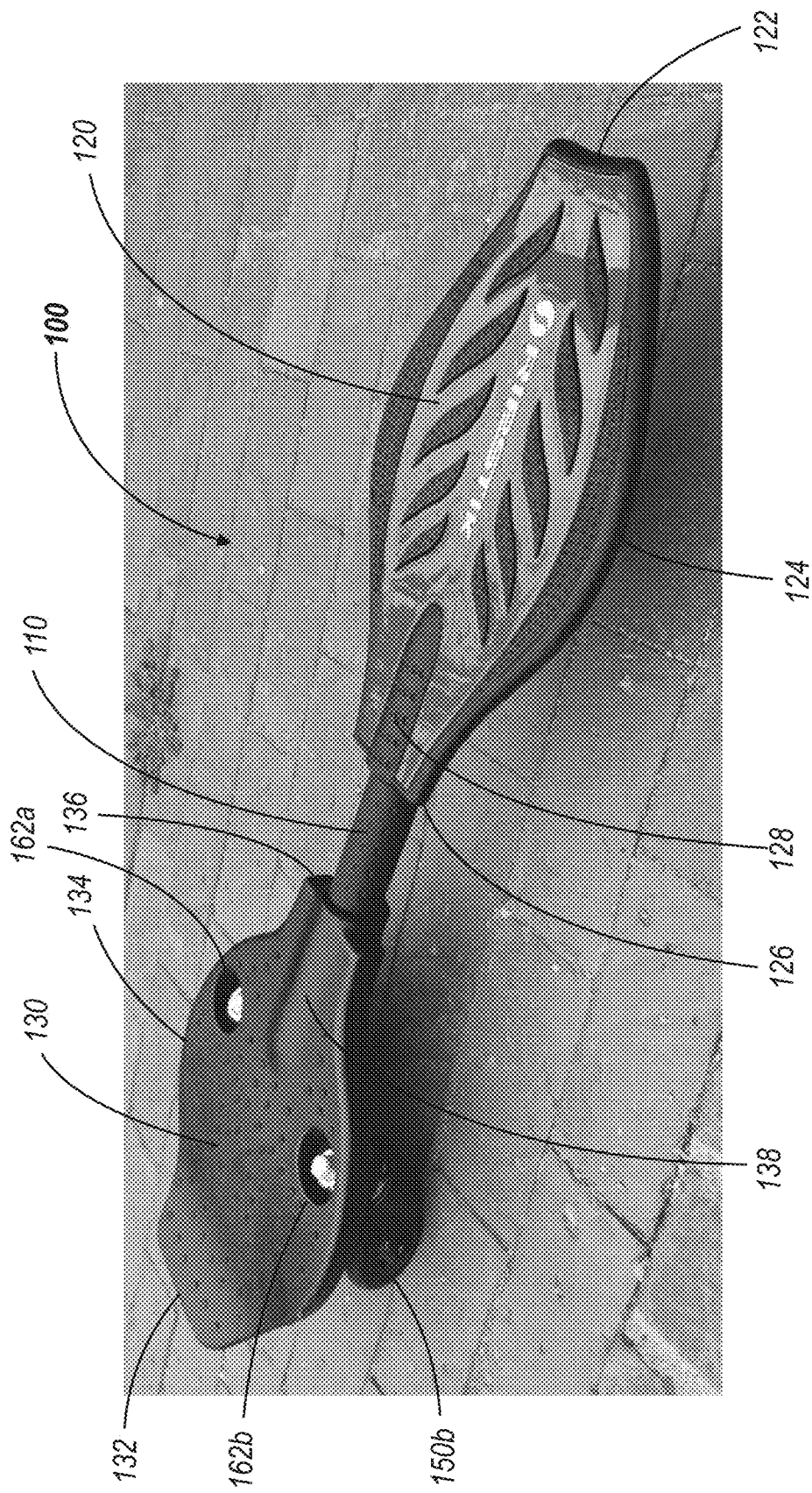
FIG. 1A depicts a top perspective view of a caster board including a multi-wheeled deck.
Figure 1B:
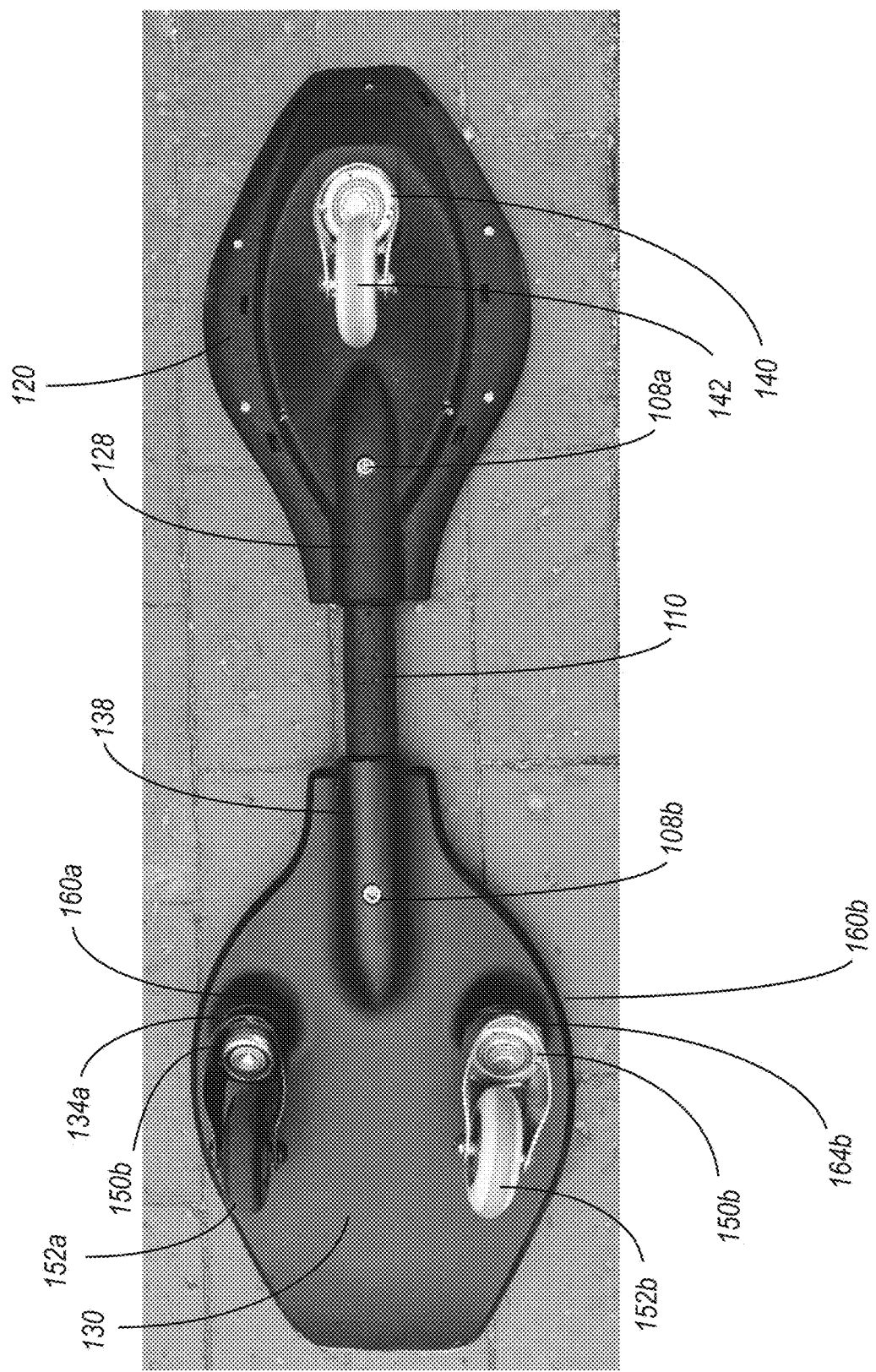
FIG. 1B depicts a bottom view of the caster board of FIG. 1A.

FIG. 1A depicts a top perspective view of a caster board including a multi-wheeled deck. FIG. 1B depicts a bottom view of the caster board of FIG. 1A. FIG. 1C depicts a bottom view of a rear deck of the caster board of FIG. 1A. The caster board 100 includes a front platform section 120 and a rear platform section 130. In the illustrated embodiment, the front platform section 120 can be connected to the rear platform section 130 only by torsion bar 110 extending therebetween. In other embodiments, however, additional structural components may also extend between and connect the front platform section 120 and the rear platform section 130, or the torsion bar 110 may be replaced by a narrow neck portion of a single contiguous platform with both front and rear platform sections.

A front caster assembly 140 can be attached to the underside of the front platform section 120, and a pair of rear caster assemblies 150a and 150b are attached to the underside of the rear platform section 130. The front caster assembly 140 and the torsion bar 106 are aligned with a centerline or central longitudinal axis of the caster board 100. The rear caster assembles 150a and 150b can be approximately symmetrically laterally offset from the central longitudinal axis of the caster board 100.

In the illustrated embodiment, the front platform section 120 includes a front edge 122, which in the illustrated embodiment has a slight convex shape and bends upward from the otherwise generally planar upper surface of the front platform section 120. Rearward of the front edge, the front platform section 120 increases in width, and then narrows in width again near the rear edge 126, which includes a receptacle section 128 for receiving the front end of the torsion bar 110. The sidewalls 126 of the front platform section 120 can be rounded at the widest point of the front platform 120, such that the sidewalls 126 have a generally sinusoidal curvature. In the illustrated embodiment, the receptacle section 128 also extends upward from the generally planar upper surface of the front platform section 120, although such an upward protrusion may not be present in other embodiments, depending on the relative thickness of the torsion bar 110 and the front platform section 120.

Similarly, the rear platform section 130 includes a rear edge 132, which in the illustrated embodiment has a generally linear shape and bends upward from the otherwise generally planar upper surface of the rear platform section 130. Forward of the rear edge 132, the rear platform section 130 increases in width, and then narrows in width again near the front edge 136, which includes a receptacle section 138 for receiving the rear end of the torsion bar 110. The sidewalls 136 of the front platform section 130 can be also rounded at the widest point of the rear platform section 130, such that the sidewalls 136 have a generally sinusoidal curvature. In the illustrated embodiment, the rear platform section 130 is wider at its widest point than the front platform section 120, although in other embodiments, the rear platform section 130 may be equal in width or narrower than the front platform section 120.

In some embodiments, the front and rear platform sections 120 and 130 may have shapes which are more or less angular than the illustrated embodiment. In some embodiments, one or both of the front and rear platform sections 120 and 130 may include one or more adjacent linear sections edges in place of the curvilinear edges depicted herein, and may be separated by discrete angular or rounded transitions.

Each of the caster assemblies 140, 150a, and 150b includes a king bolt or other suitable structure to mount the caster assemblies 140, 150a, and 150b to the underside of the respective platform portions 120 and 130 to which they are attached. The rear platform section 130 includes mounting locations 160a and 160b which include angled mounting surfaces 164a and 164b on the rear underside of depressions 162a and 162b in the rear platform section 130. In particular, the king bolts can be inserted through apertures in angled mounting surfaces 164a and 164b oriented at an oblique angle to the rear platform portion 130. In the illustrated embodiment, the angled mounting surfaces 164a and 164b are part of depressions 162a and 162b in the platform 110, but in other embodiments, the angled mounting surfaces 164a and 164b may be defined by an intermediate structure which is secured to the rear platform 130.

By securing the rear caster assemblies 150a and 150b using depressions 162a and 162b in the rear platform section 130, the rear caster assemblies 150a and 150b can be readily accessed by a user, and the caster assemblies 150a and 150b can be replaced, if desired, by alternative caster assemblies which may have different properties, such as different wheel types or sizes Like the rear caster assemblies 150a and 150b, the front caster assembly 140 is mounted to a rearwardly facing angled surface of the underside of the front platform section 120. However, in the illustrated embodiment, the front caster assembly 140 does not have an exposed nut or other connector connecting the king bolt of the front caster assembly 140 to the front platform section 120. In some embodiments, an otherwise exposed connection may be hidden and/or covered with a cover plate which may be removably or permanently secured to the front platform section 120.

In some embodiments, the angled mounting surfaces 164a and 164b can be generally parallel to one another, and/or can be generally parallel to the angled mounting surface to which the front caster assembly 140 is mounted. The king bolts of the caster assemblies 140, 150a, and 150b can be oriented at an oblique angle to the substantially planar portions of the front and rear platform sections 120 and 130. In some embodiments, this oblique angle is less than 45 degrees, and in some particular embodiments, this oblique angle is roughly 30 degrees. The angle at which the king bolts 142 is installed can be a function of the angle of the angled mounting surfaces such as angled mounting surfaces 164a and 164b.

The king bolts of the caster assemblies 140, 150a, and 150b support caster yokes or forks, the arms of which forks extend on either side of the wheels 142, 152a, and 152b to support a wheel pin or axle extending therebetween. The caster assemblies 140, 150a, and 150b may be rotatable 360 degrees about the king bolts 142. In some embodiments, the range of rotation of the caster assemblies may be constrained to inhibit rotation beyond a certain range.

This rotation may be facilitated through the use of one or more bearings. In the illustrated embodiment, each of the caster assemblies 140, 150a, and 150b include a thrust bearing disposed between the crossbar of the fork and the angled mounting surface, and a radial bearing disposed between the crossbar of the fork and the head of the king bolt, between the arms of the fork. The use of one or more suitable bearings allows rotation of the caster assemblies 140, 150a, and 150b even when the caster assembles 140, 150a, and 150b are under the load of a rider operating the caster board 100.

In the illustrated embodiment, the heads of the king bolts are located adjacent the wheels 152a, and 152b, and nuts on the opposite sides of the angled mounting surface 164a and 164b are used to retain the king bolt in place. In some embodiments the orientation of the king bolt and nut may be reversed. In some embodiments, other suitable king pin structures other than a threaded nut and bolt may be used to retain the caster assemblies 140, 150a, and 150b in place.

The forks of the caster assemblies 140, 150a, and 150b support the wheels 142, 152a, and 152b in an offset position, in which the axis of the king bolt does not intersect the wheel axle. Instead, the wheel axles are radially offset from the axis of the king bolt. Rotation of the caster assemblies 140, 150a, and 150b sweeps the wheels 142, 152a, and 152b, and particular the contact point of the wheels 142, 152a, and 152b with an underlying surface, out of the respective planes in which the wheels 142, 152a, and 152b will be located in when in a neutral unloaded position.

In some embodiments, the caster assemblies 140, 150a, and 150b may be self-centering and may be biased to return to a position in which the wheels 142, 152a, and 152b are aligned with or parallel to the longitudinal axis of the caster board 100. In some embodiments, the caster assemblies 140, 150a, and 150b may include a self-centering mechanism such as a coil spring torsion spring (not shown), configured to exert a restoring force on the caster assemblies 140, 150a, and 150b when the caster assemblies 140, 150a, and 150b rotate such that the wheels 142, 152a, and 152b are oriented at oblique angles to the longitudinal axis of the caster board 100. In some embodiments, the self-centering mechanism may be external to the caster assembly, connected between a portion of the front or rear platform section 120 or 130 and a portion of the caster assemblies 140, 150a, and 150b. In some embodiments, the self-centering mechanism may be at least partially internal to the caster assembly, such as through the use of an internal torsion spring.

The torsion bar 110 can be secured to the front platform section 120 via a first retention structure 108a, and secured to the rear platform section 120 via a second retention structure 108b, These retention structures 108a and 108b may permanently secure the torsion bar 110 in place, or may removably secure the torsion bar 110 in place, allowing for the use of different torsion bars to change the riding characteristics of the caster board 100.

By providing a rear platform section 130 with two wheels, the sway of the rear platform section 100 to the side can be constrained, providing a more stable platform for a rider's rear foot. This can allow a younger or less experienced rider to operate the caster board with a less exaggerated twisting motion and acclimate to the operation and ride of the caster board. However, a caster board may be used by multiple riders of differing skill levels, and the skill level of a rider will increase over time. For more experienced riders, a second wheel on the rear platform section may overly constrain the operation of the caster board by limiting the motion of a rider.

In some embodiments, a caster board may be provided which can be convertible between a configuration in which the board includes two wheels, and a configuration in which the caster board includes three (or more) wheels, including multiple wheels on a given platform section. To allow for conversion between multiple configurations, a caster board may include a plurality of user-accessible mounting locations for caster assemblies, including an additional alternative mounting location for a caster assembly. By providing a plurality of user-accessible mounting locations, a user may adjust the number and/or locations of caster assemblies supported by a platform section of the caster board to alter the configuration of the caster board.

Such a convertible caster board may be usable by a rider as the rider gains experience. A new or less-experienced rider may begin by riding the caster board while in the more stable laterally offset multi-wheel configuration. Once the rider has reached a certain level of comfort and experience, the rider is then able to change the configuration of the convertible caster board into an inline two-wheel arrangement from the laterally offset multi-wheel arrangement.

Figure 2A:
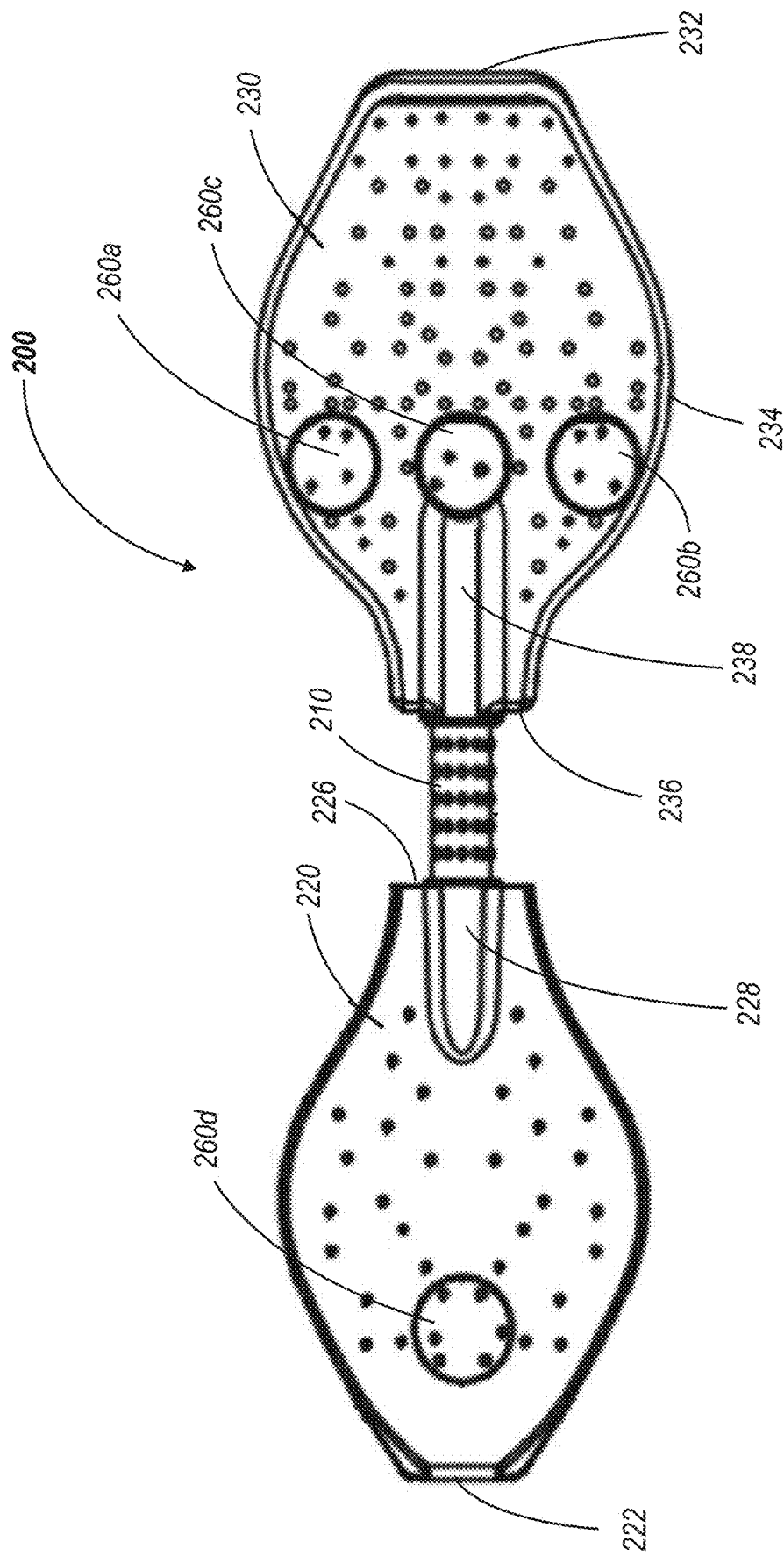
FIG. 2A is a top plan view of an embodiment of a caster board with a rear deck including multiple mounting locations for wheels, including an alternate mounting location.
Figure 2B:
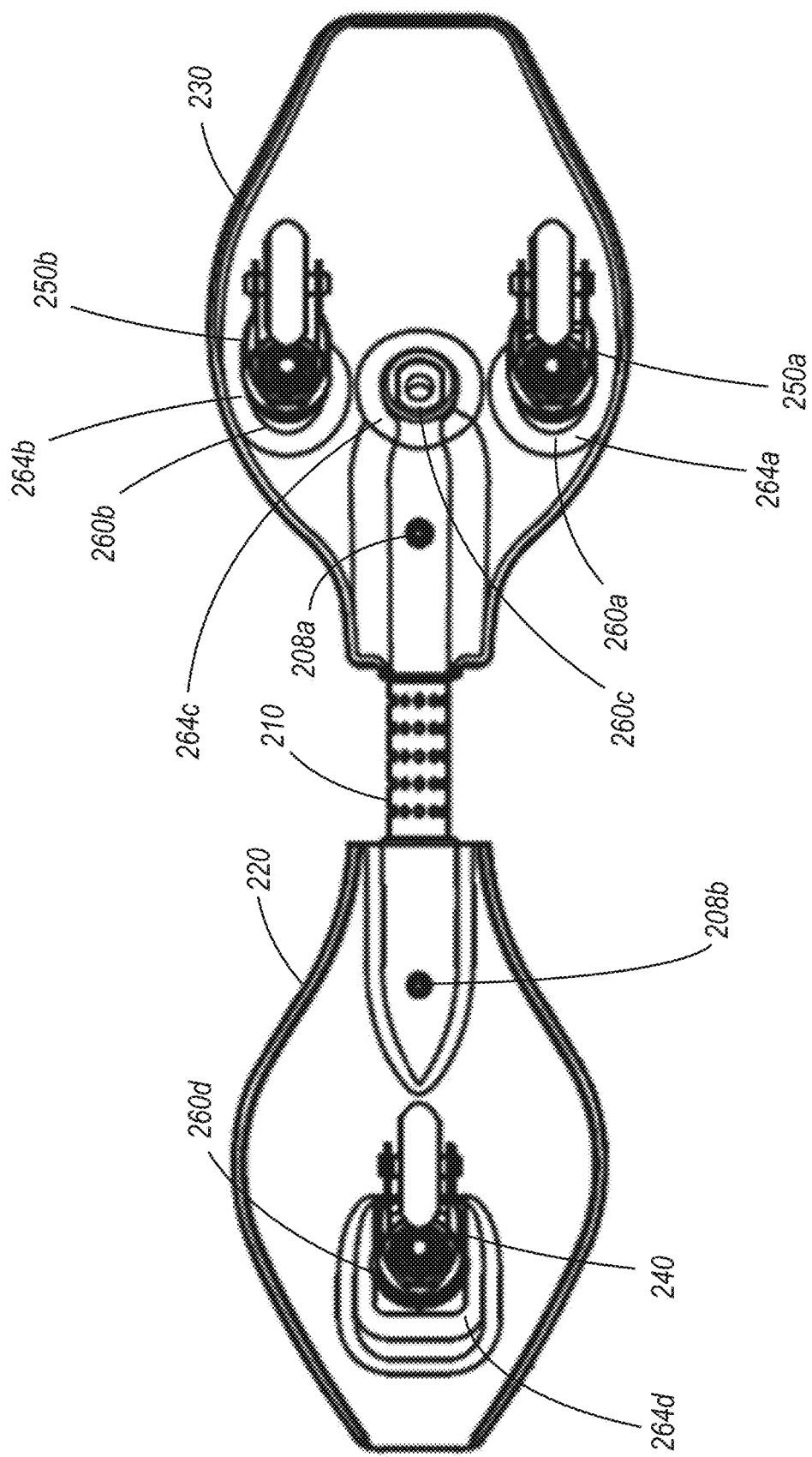
FIG. 2B is a bottom plan view of the caster board of FIG. 2A.
Figure 2C:
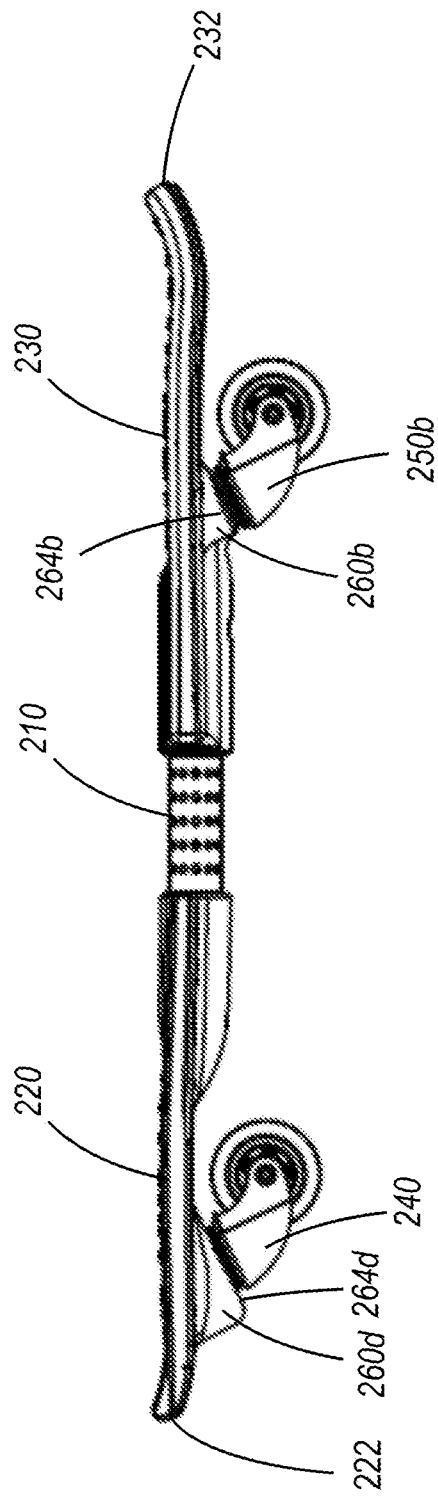
FIG. 2C is a left side view of the caster board of FIG. 2A, the right side view being a mirror image thereof.
Figure 2E:
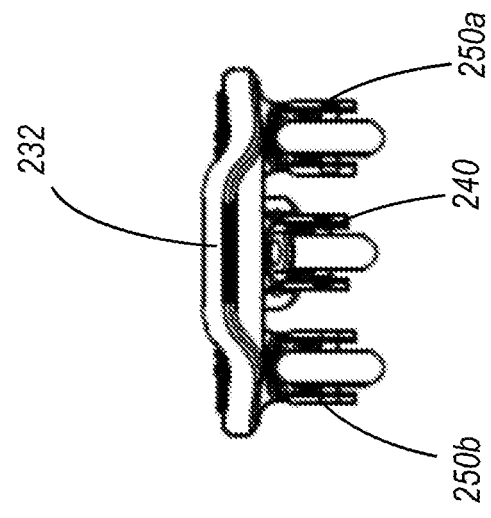
FIG. 2E is a rear view of the caster board of FIG. 2A.
Figure 2D:
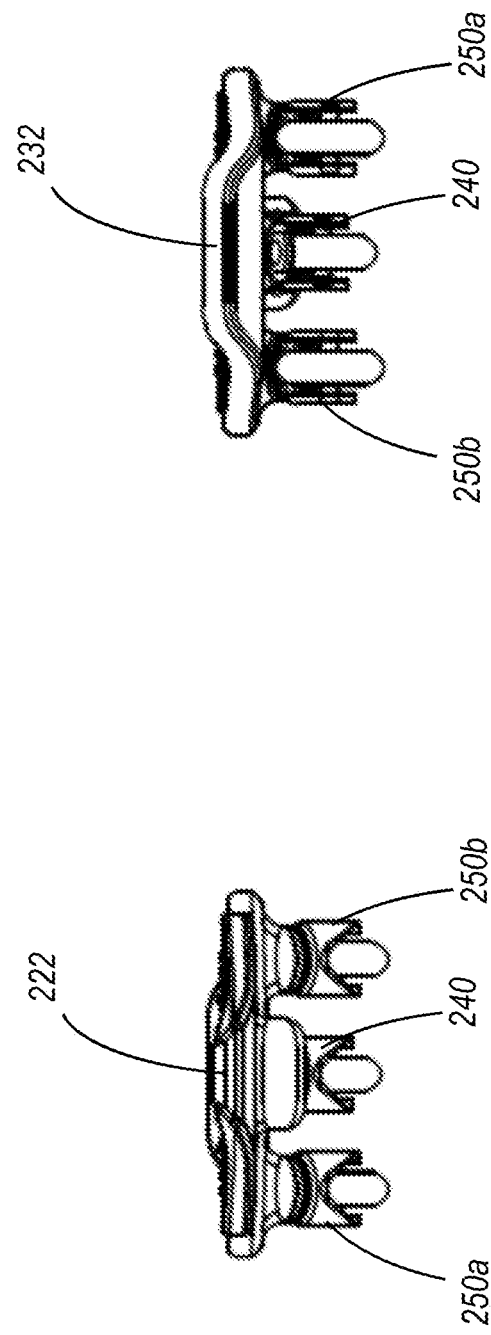
FIG. 2D is a front view of the caster board of FIG. 2A.
Figure 3:
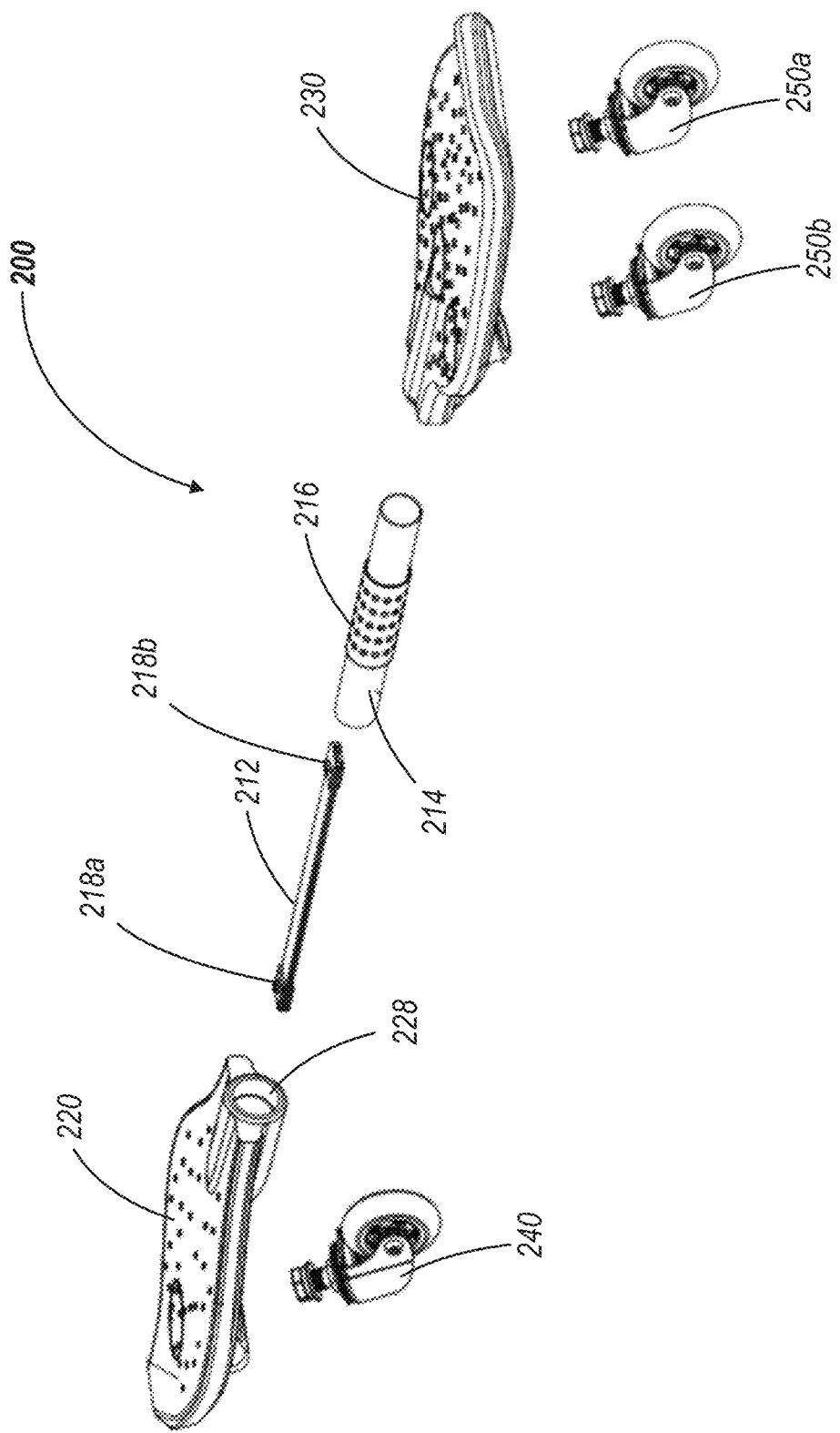
FIG. 3 is an exploded assembly view of the caster board of FIG. 2A.

FIG. 2A is a top plan view of an embodiment of a caster board 200 with a rear deck including multiple mounting locations for wheels, including an alternate mounting location. FIG. 2B is a bottom plan view of the caster board of FIG. 2A. FIG. 2C is a left side view of the caster board of FIG. 2A, the right side view being a mirror image thereof. FIG. 2D is a front view of the caster board of FIG. 2A. FIG. 2E is a rear view of the caster board of FIG. 2A. FIG. 3 is an exploded assembly view of the caster board of FIG. 2A. The caster board 200 can include any of the features of the caster board 100.

Like the caster board 100 of FIG. 1A, the caster board 200 includes a front platform section 220 connected to a rear platform section 230 by a torsion bar 210 extending between the front platform section 220 and the rear platform section 230. As noted above with respect to the caster board 100 of FIG. 1A, additional structural components may in other embodiments also extend between and connect the front platform section 220 and the rear platform section 230, or the torsion bar 210 may be replaced by a narrow neck portion of a single contiguous platform with both front and rear platform sections 220 and 230.

Like caster board 100 of FIG. 1A, the front platform section 220 includes a front edge 222, which in the illustrated embodiment has a slight convex shape and bends upward from the otherwise generally planar upper surface of the front platform section 220, as can be seen in FIG. 2A. Rearward of the front edge 222, the front platform section 220 increases in width, and then narrows in width again near the rear edge 226, which includes a receptacle section 228 for receiving the front end of the torsion bar 210. The sidewalls 226 of the front platform section 220 can be rounded at the widest point of the front platform section 220, such that the sidewalls 226 have a generally sinusoidal curvature.

Similarly, the rear platform section 230 includes a rear edge 232, which in the illustrated embodiment has a generally linear shape and bends upward from the otherwise generally planar upper surface of the rear platform section 230. Forward of the rear edge 232, the rear platform section 230 increases in width, and then narrows in width again near the front edge 236, which includes a receptacle section 238 for receiving the rear end of the torsion bar 210. The sidewalls 234 of the front platform section 230 can be rounded at the widest point of the rear platform section 230, such that the sidewalls 236 have a generally sinusoidal curvature. In the illustrated embodiment, the rear platform section 230 is wider at its widest point than the front platform section 220, although in other embodiments, the rear platform section 230 may be equal in width or narrower than the front platform section 220.

In the illustrated embodiment, the receptacle sections 228 and 238 extends upward from the generally planar upper surfaces of the front and rear platform sections 220 and 230, as well as downward below the underside of the front and rear platform sections 220 and 230. This allows the accommodation of a torsion bar 210 which as illustrated is thicker than the adjacent portions of the front and rear platform sections 220 and 230. This upward protrusion can be located near the portions of the front and rear platform sections 220 and 230 adjacent the torsion beam 210 A substantial portion of the front and rear platform sections 220 and 230 can be substantially planar, allowing for the placement of a rider's feet.

As can be seen in FIG. 3, the torsion bar 210 includes a torsion spring element 212 disposed within a sleeve 214. The central portion of the sleeve 214 which can be exposed between the front and rear platform sections 220 and 230 when the torsion bar 210 is installed, may include a grip section 216. The torsion spring element 212 includes mounting apertures 218a and 218b, designed to respectively receive retention structures 208a and 208b to secure the torsion bar 210 to the front and rear platform sections 220 and 230.

The front platform section 220 includes a single mounting location 260d, longitudinally aligned with the torsion bar 260 and a longitudinal axis of the caster board 200. A front caster assembly 240 can be attached to the underside of the front platform section 220 at this inline mounting location 260d. The front caster assembly 240 can be attached to an angled mounting surface 264d on the rear side of a depression 262d in the front platform section 240.

The rear platform section 230 includes a pair of laterally offset mounting locations 260a and 260b which include angled mounting surfaces 264a and 264b on the rear underside of depressions 262a and 262b in the rear platform section 230. In the configuration illustrated in FIGS. 2B-3, the caster board 200 includes a pair of rear caster assemblies 250a and 250b installed in the laterally offset mounting locations 260a and 260b.

In addition to the laterally offset mounting locations 260a and 260b, the rear platform section 230 includes a central alternative mounting location 260c. In the illustrated embodiment, the alternative mounting location 260c can be longitudinally aligned with the torsion bar 260 and a longitudinal axis of the caster board 200, and with the mounting location 260d of the front caster board Unlike the rear mounting locations 160a and 160b of the caster board 100, the laterally offset mounting locations 260a and 260b and the centrally aligned alternative mounting location 260c in the illustrated embodiment do not include a visible corresponding depression in the upper surface of the rear surface. In some embodiments, this may be because the rear platform section 230 includes depressions covered by one or more removable covers, where the cover or covers, either alone or in cooperation with the remainder of the rear platform section 230, provide a contiguous upper surface of the rear platform section 230. In other embodiments, no user-accessible depressions are provided in the rear platform section 230. In such an embodiment, a king bolt of a caster assembly may be screwed into or otherwise inserted into an aperture in an angled mounting surface of a mounting location, and retained therein in any suitable manner.

In the illustrated embodiment, the laterally offset mounting locations 260a and 260b are linearly aligned with the centrally aligned alternative mounting location 260c located therebetween. In other embodiments, however, the centrally aligned alternative mounting location 260c may be located forward or rearward of the laterally offset mounting locations 260a and 260b.

The mounting locations 260a, 260b and 260c can be located near the forward edge 236 of the rear platform section 230, such that the centrally aligned alternative mounting location 260c is located near the receptacle section 238 of the rear platform section 230 which receives the torsion bar 210. In other embodiments, however, some or all of the mounting locations 260a, 260b and 260c may be located in a different position, such as a rearward position relative to the positions of the mounting locations 260a, 260b and 260c in the illustrated embodiment.

The angled mounting surfaces 264a and 264b can be generally parallel to one another, and can be parallel to the angled mounting surface 264c of the alternative mounting location 260c, and parallel to the angled mounting surface 264d to which the front caster assembly 240 is mounted. The king bolts of the caster assemblies 240, 250a and 250b can be oriented at oblique angles, which in the illustrated embodiments are the same angles, to the substantially planar portions of the front and rear platform sections 220 and 230. In some embodiments, such an oblique angle is less than 45 degrees, and in some particular embodiments, this oblique angle is roughly 30 degrees. The angles at which the king bolts are installed can be a function of the angle of the angled mounting surfaces 264a, 264b, 264c, and 264d.

The use of the same or similar oblique angles for each of the angled mounting surfaces 264a, 264b, 264c, and 264d can facilitate the use of the same caster assemblies at any of the mounting locations. In such an embodiment, for example, one of the caster assemblies 250a or 250b mounted at mounting locations 260a and 260b can be removed from their original mounting location and installed at the alternative mounting location 260c.

In other embodiments, the alternative mounting location 260c, as well as the mounting location 260a on the front platform, may differ in size, shape, and/or orientation from the laterally-offset mounting locations 260a and 260b. In such an embodiment, caster assemblies 250a and 250b may be designed for use in a multi-wheel configuration, and a different caster assembly designed for use in an in-line configuration may be used at alternative mounting location 260c when the caster board 200 is changed to a different configuration.

Figure 4A:
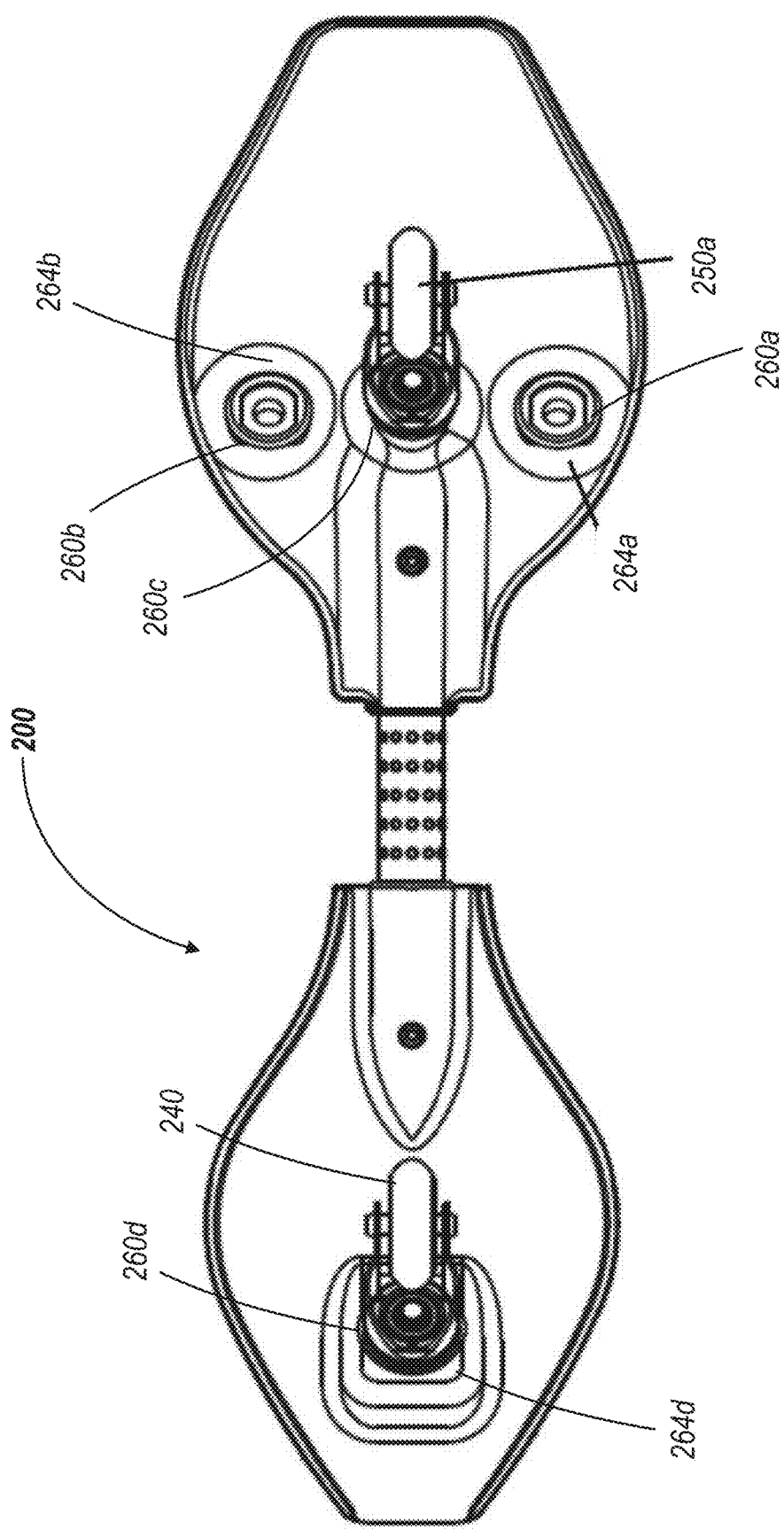
FIG. 4A is a bottom plan view of an alternative configuration of the caster board of FIG. 2A, with a single rear wheel installed at the alternative mounting location.

FIG. 4A is a bottom plan view of an alternative configuration of the caster board 200 of FIG. 4A, with a single rear wheel installed at the alternative mounting location. FIG. 4B is a left side view of the caster board configuration of FIG. 4A. FIG. 4C is a front view of the caster board configuration of FIG. 4A. FIG. 4D is a rear view of the caster board configuration of FIG. 4A. In FIG. 4A, it can be seen that the caster assemblies 250a and 250b have been removed from the laterally offset mounting locations 260a and 260b, and caster assembly 250a has been installed in the central alternative mounting location 260c.

The caster board 200 has been converted from a first configuration in which the rear platform section 230 includes a pair of laterally offset wheels to a second configuration in which the rear platform section 230 includes a single wheel, longitudinally aligned with the wheel of the front platform section 220 and the torsion bar 210. In some embodiments, this conversion can be performed, and reverted, by a user, with minimal or no tools. Other modifications may also be performed, however. In some embodiments, the torsion bar 210 may be replaced with a torsion bar more suited for the second, in-line configuration, such as a torsion bar with a different spring constant. In some embodiments, the same caster assembly may not be reused in the second configuration, and a separate caster assembly may be installed at the alternative mounting location 260c.

Figure 5A:
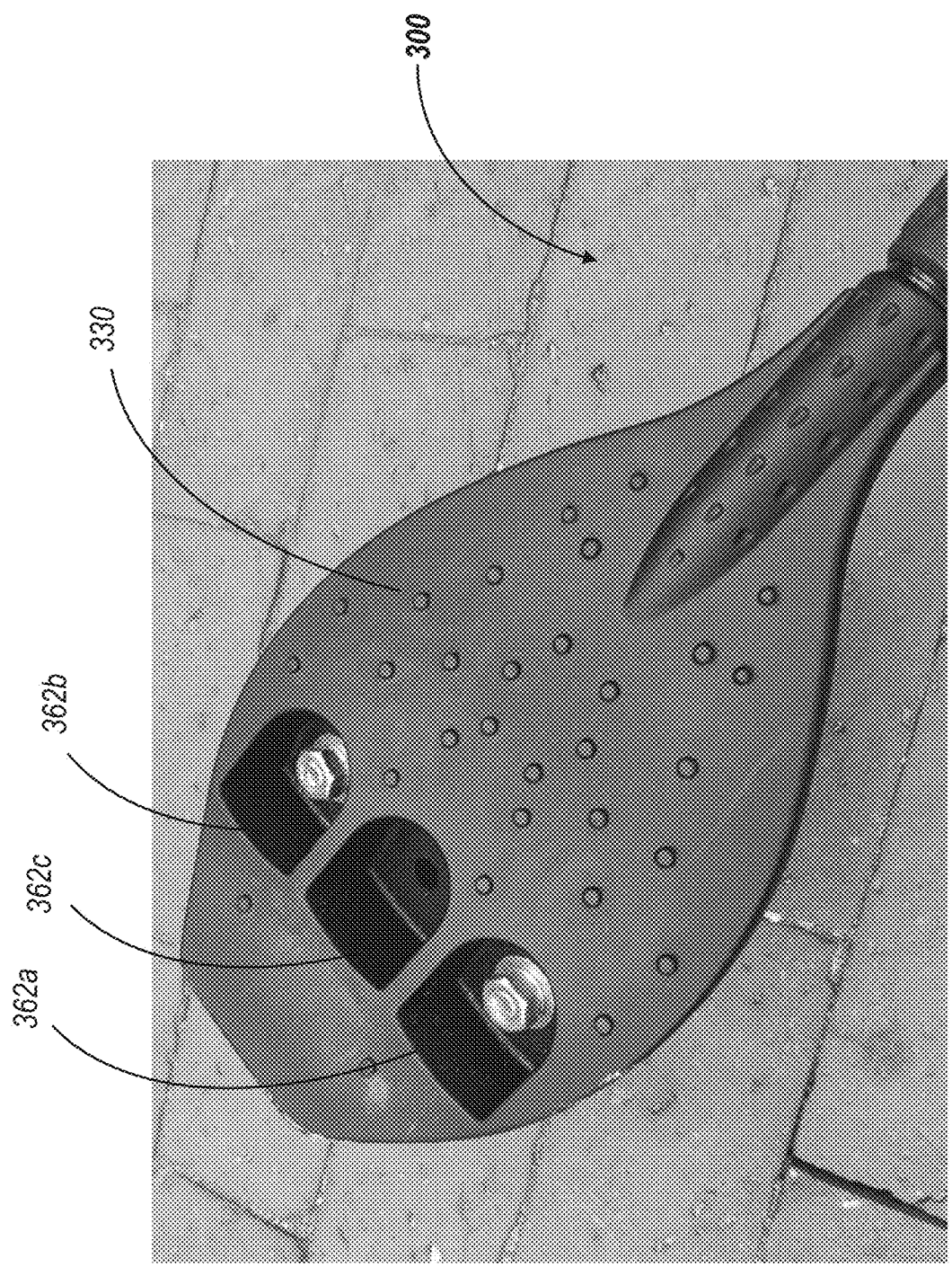
FIG. 5A depicts a top perspective view of another embodiment of a caster board with a rear deck including multiple mounting locations for wheels, including an alternate mounting location.
Figure 5B:
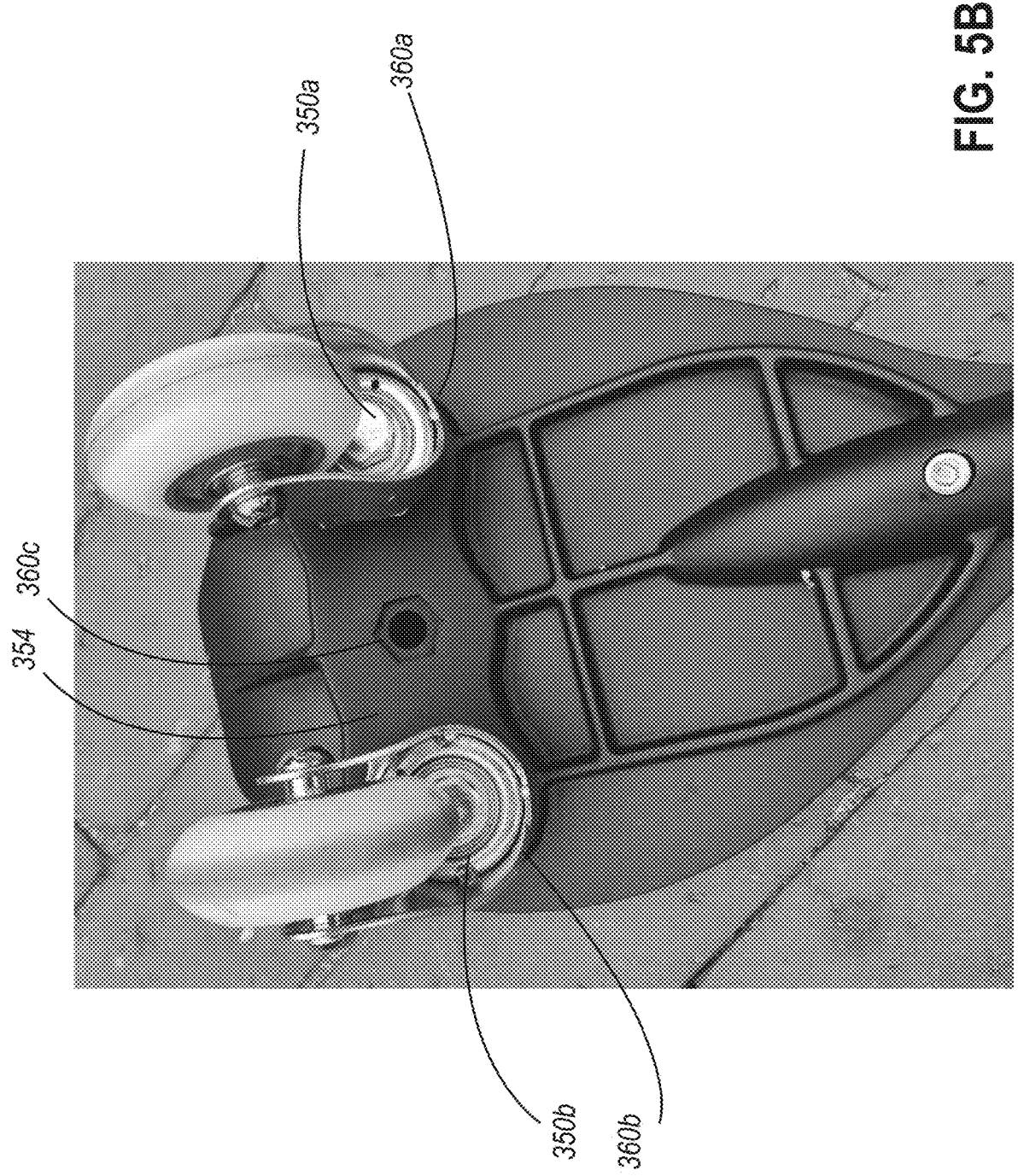
FIG. 5B depicts a bottom view of the caster board of FIG. 5A with the alternate mounting location.

FIG. 5A depicts a top perspective view of another embodiment of a rear platform of a caster board 300 with a rear deck including multiple mounting locations for wheels, including an alternate mounting location. FIG. 5B depicts a bottom view of the caster board of FIG. 5A with the alternate mounting location. The caster board 300 can include any of the features of the caster board 100 and/or the caster board 200. The rear platform section 330 of the convertible caster board 300 differs from the rear platform section 230 of the convertible caster board 200 of FIG. 2A in that the upper surface of the rear platform section 230 includes discrete depressions 362a, 362b, and 362c at each of the laterally offset mounting locations 360a and 360b and the central alternative mounting location 360c, such that nuts or other securement features securing the caster assemblies 350a and 350b in place can be readily accessed from the upper surface of the rear platform.

The rear platform section 330 of the convertible caster board 300 also differs from the rear platform section 230 of the convertible caster board 200 of FIG. 2A in that the mounting locations 360a, 360b, and 360c can be located rearward of the widest part of the rear platform section 330. In addition, the mounting locations 360a, 360b, and 360c represent distinct apertures in a single generally planar angled mounting surface 354. As can be seen in FIG. 5B, the mounting locations may include a non-circular depression surrounding a circular aperture, such that a specific orientation of a caster assembly can be compelled by the fit between the caster assembly and the non-circular depression, preventing rotational misalignment of the caster assembly relative to the rear platform.

FIG. 6 is a flow diagram illustrating an exemplary process for modifying a configuration of a convertible caster board. The process 400 begins at a stage 405 where a convertible caster board having a first configuration is provided and/or obtained, the caster board including a platform section having two caster assemblies mounted at laterally offset mounting locations. The platform section may be connected, via a torsion bar, to a second platform section having a single caster assembly mounted underneath the second platform section. The caster assemblies may be located underneath the platform section and support the platform section thereon. The caster assemblies may include a trailing wheel.

The process 400 then moves to a stage 410 where the two caster assemblies mounted in laterally offset mounting locations are removed from those mounting locations. In some embodiments, this may be done by removing a nut or other securement device spaced apart from a caster fork of the caster assembly by at least a portion of the platform section.

The process 400 then moves to a stage 415 where a caster assembly is installed in a centrally-aligned alternative mounting location to place the convertible caster board in a second configuration. In some embodiments, the centrally-aligned alternative mounting location is longitudinally aligned with a single caster assembly mounted underneath the second platform section to provide an in-line two-wheeled configuration as the second configuration. In some embodiments, the installed caster assembly may be one of the two caster assemblies removed at stage 405.

The present disclosure includes ornamental aspects of the caster boards and such ornamental aspects may be claimed. Some such claims encompass only part of the disclosed caster boards. For example, the caster wheels, fasteners, parting and/or sculpting lines, and other features therein may be disclaimed. In some embodiments, the ornamental features shown in the various features are claimed.

While certain embodiments have been described, these embodiments have been presented by way of example only and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope of the disclosure.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Certain terminology may be used in the following description for the purpose of reference only, and thus is not intended to be limiting. For example, terms such as "upper", "lower", "upward", "downward", "above", "below", "top", "bottom", "left", and similar terms refer to directions in the drawings to which reference is made. Such terminology may include the words specifically mentioned above, derivatives thereof, and words of similar import. Similarly, the terms "first", "second", and other such numerical terms referring to structures neither imply a sequence or order unless clearly indicated by the context.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "spherical" or "circular" or "cylindrical" or "semi-circular" or "semi-cylindrical" or any related or similar terms, are not required to conform strictly to the mathematical definitions of spheres, circles, cylinders or other structures, but can encompass structures that are reasonably close approximations.

The terms "approximately," "about," and "substantially" as used herein represent an amount close to the stated amount that still performs a desired function or achieves a desired result. For example, in some embodiments, as the context may permit, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may permit, the term "generally parallel" can refer to something that departs from exactly parallel by less than or equal to 20 degrees. As another example, in certain embodiments, as the context may permit, the term "generally perpendicular" can refer to something that departs from exactly perpendicular by less than or equal to 20 degrees.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Some embodiments have been described in connection with the accompanying drawings. The figures are drawn to scale, but such scale is not limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

Although the invention has been disclosed in the context of certain embodiments and examples, it will be understood by those skilled in the art that this disclosure extends beyond the specifically disclosed embodiments to other alternative embodiments and/or uses of the embodiments and certain modifications and equivalents thereof. The scope of the present disclosure is not intended to be limited by the specific disclosures of preferred embodiments in this section or elsewhere in this specification, and may be defined by claims as presented in this section or elsewhere in this specification or as presented in the future.

What is claimed is:

1. A convertible caster board assembly comprising:
   a first platform section comprising an upper surface configured to contact a first foot of a user, the first platform section supported by a first caster assembly including a first wheel;
   a second platform section comprising an upper surface configured to contact a second foot of the user, the second platform section comprising a plurality of wheel mounting locations, the plurality of wheel mounting locations comprising:
      a first caster wheel mounting location being aligned with a longitudinal axis of the caster board,
      a second caster wheel mounting location being laterally offset from the longitudinal axis of the caster board, and
      a third caster wheel mounting location being laterally offset from the longitudinal axis of the caster board and on an opposite side of the longitudinal axis as the second wheel mounting location,
      wherein a straight line passes through the first, second, and third caster wheel mounting locations;
   the second platform section supported by a second caster assembly including a second wheel, the second caster assembly installed at one of the plurality of wheel mounting locations; and
   a connecting structure extending between the first platform section and the second platform section, an exposed portion of the connecting structure extending between the rear edge of the first platform section and the front edge of the second platform section,
   wherein the first caster wheel mounting location comprises an aperture extending through an angled mounting surface extending at an oblique angle from a lower surface of the second platform section and facing away from the connecting structure, and wherein the aperture extending through the angled mounting surface is located between the connector and a longitudinal midpoint of a line connecting a front edge of the upper surface of the second platform section and a rear edge of the upper surface of the second platform section.

2. The convertible caster board assembly of claim 1, wherein the second and third caster wheel mounting locations are offset from the longitudinal axis by an equal distance.

3. The convertible caster board assembly of claim 1, wherein the second caster assembly is installed at the first caster wheel mounting location, and wherein no caster assemblies are installed at the second and third caster wheel mounting locations.

4. The convertible caster board assembly of claim 1, additionally comprising a third caster assembly including a third wheel, wherein the second caster assembly is installed at the second caster wheel mounting location, and wherein the third caster assembly is installed at the third caster wheel mounting location.

5. The convertible caster board assembly of claim 1, wherein the exposed section of the connecting structure is not covered by the first platform section or the rear platform section.

6. The convertible caster board assembly of claim 1, wherein the second caster wheel mounting location comprises an aperture extending through a second angled mounting surface extending at an oblique angle from a lower surface of the second platform section and facing away from the connecting structure.

7. The convertible caster board assembly of claim 6, wherein the aperture extending through the second angled mounting surface is located between the connector and a longitudinal midpoint of the line connecting the front edge of the upper surface of the second platform section and the rear edge of the upper surface of the second platform section, and wherein the second angled mounting surface is canted downward toward the longitudinal midpoint of the line connecting the front edge of the upper surface of the second platform section and the rear edge of the upper surface of the second platform section.

8. The convertible caster board assembly of claim 1, wherein the second caster wheel mounting location comprises a second aperture extending through the angled mounting surface.

9. The convertible caster board assembly of claim 1, wherein the second wheel is part of a caster assembly.

10. The convertible caster board assembly of claim 1, wherein the connecting structure permits the first platform section to twist about the longitudinal axis of the caster board relative to the second platform section.

11. The convertible caster board assembly of claim 1, wherein the connecting structure comprises a torsion bar.

12. The convertible caster board assembly of claim 1, wherein the connector is secured to the second platform section at a location rearward of the front edge of the upper surface of the second platform section.

13. The convertible caster board assembly of claim 1, wherein the angled mounting surface is canted downward toward the longitudinal midpoint of the line connecting the front edge of the upper surface of the second platform section and the rear edge of the upper surface of the second platform section.

14. A convertible caster board assembly comprising:
a front platform section comprising an upper surface configured to contact a first foot of a user, the front platform section supported by a first caster wheel assembly;
a rear platform section comprising an upper surface configured to contact a second foot of a user, the rear platform section connected to the front platform section by a neck and supported by a second caster wheel assembly, an exposed portion of the neck extending between a rear edge of the upper surface of the first platform section and a front edge of the upper surface of the second platform section, the rear platform section including a plurality of mounting locations, the plurality of mounting locations including:
a central mounting location;
a first offset mounting location laterally offset from the central mounting location in a first lateral direction; and
a second offset mounting location laterally offset from the central mounting location in a second lateral direction opposite the first lateral direction, wherein each of the plurality of mounting locations comprises an aperture extending through a mounting surface oriented at an oblique angle to a lower surface of the rear platform, wherein each of the apertures in the mounting surfaces is located between the neck and a longitudinal midpoint of a line connecting a front edge of the upper surface of the rear platform section and a rear edge of the upper surface of the rear platform section,
the second caster wheel assembly installed in one of the plurality of mounting locations, the first and second caster assemblies spaced apart from each other along a longitudinal axis of the caster board by a wheelbase distance, the wheelbase distance being substantially the same regardless of whether the second caster wheel assembly is installed in the central mounting location, first offset mounting location, or second offset mounting location.

15. The convertible caster board assembly of claim 14, wherein each of the plurality of mounting locations is configured to have the second caster wheel assembly installed therein.

16. The convertible caster board assembly of claim 14, wherein the exposed section of the connecting structure is not covered by the first platform section or the rear platform section.

17. The convertible caster board assembly of claim 14, wherein each of the plurality of mounting locations underlies a depression in the upper surface of the rear platform section.

18. The convertible caster board assembly of claim 14, wherein the neck comprises a torsion bar.

19. The convertible caster board assembly of claim 14, wherein the connector is secured to the second platform section at a location rearward of the front edge of the upper surface of the second platform section.

20. The convertible caster board assembly of claim 14, wherein each of the mounting surfaces is canted downward toward the longitudinal midpoint of the line connecting the front edge of the upper surface of the rear platform section and the rear edge of the upper surface of the rear platform section.

* * * * *